US012363474B2

(12) United States Patent
Voishvillo

(10) Patent No.: US 12,363,474 B2
(45) Date of Patent: Jul. 15, 2025

(54) OMNIDIRECTIONAL LOUDSPEAKER WITH ASYMMETRIC VERTICAL DIRECTIVITY

(71) Applicant: HARMAN INTERNATIONAL INDUSTRIES, INCORPORATED, Stamford, CT (US)

(72) Inventor: Alexander Voishvillo, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 255 days.

(21) Appl. No.: 18/252,786

(22) PCT Filed: Nov. 26, 2020

(86) PCT No.: PCT/US2020/062459
§ 371 (c)(1),
(2) Date: May 12, 2023

(87) PCT Pub. No.: WO2022/115106
PCT Pub. Date: Jun. 2, 2022

(65) Prior Publication Data
US 2024/0007784 A1 Jan. 4, 2024

(51) Int. Cl.
*H04R 1/34* (2006.01)
*H04R 1/02* (2006.01)
(Continued)

(52) U.S. Cl.
CPC ............. *H04R 1/345* (2013.01); *H04R 1/025* (2013.01); *H04R 9/06* (2013.01); *H04R 1/30* (2013.01); *H04R 7/12* (2013.01); *H04R 2201/34* (2013.01)

(58) Field of Classification Search
CPC .......... H04R 1/345; H04R 1/025; H04R 9/06; H04R 1/30; H04R 7/12; H04R 2201/34
(Continued)

(56) References Cited

U.S. PATENT DOCUMENTS 4,134,471 A 1/1979 Queen
4,496,021 A 1/1985 Berlant
(Continued)

FOREIGN PATENT DOCUMENTS

CN 106470372 A 3/2017
CN 108605182 A 9/2018
(Continued)

OTHER PUBLICATIONS

European Office Action for Application No. 19 797 875.2, dated May 27, 2024, 10 pages.
(Continued)

*Primary Examiner* — Sean H Nguyen
(74) *Attorney, Agent, or Firm* — Brooks Kushman P.C.

(57) ABSTRACT

A compression driver for an omnidirectional loudspeaker includes a motor assembly and an annular diaphragm disposed coaxially below and operably connected to the motor assembly. A phasing plug is mounted to the motor assembly and includes a top portion facing the diaphragm, a bottom portion extending downwardly from the top portion from a first end to a second end, and a plurality of apertures that extend therethrough. The bottom portion has an inner surface that defines a cavity and widens from the first end to the second end, the inner surface having a plurality of radial channels with a diagonal orientation acoustically connected to the apertures. A housing is mounted to the phasing plug and received within the cavity, the housing having an outer surface spaced from the inner surface of the bottom portion to form a waveguide arranged to radiate sound waves downwardly and outwardly with asymmetric vertical directivity.

20 Claims, 5 Drawing Sheets

(51) Int. Cl.
*H04R 1/30* (2006.01)
*H04R 7/12* (2006.01)
*H04R 9/06* (2006.01)

(58) Field of Classification Search
USPC .......................................................... 381/343
See application file for complete search history.

(56) References Cited

U.S. PATENT DOCUMENTS

| | | | | |
|---|---|---|---|---|
| 4,908,601 | A | 3/1990 | Howze | |
| 5,253,301 | A | 10/1993 | Sakamoto et al. | |
| 5,359,158 | A | 10/1994 | Queen | |
| 8,469,140 | B1 | 6/2013 | Graber | |
| 8,670,585 | B2 | 3/2014 | Valtchev et al. | |
| 9,245,513 | B1 | 1/2016 | Dimitrov | |
| 2008/0192972 | A1 | 8/2008 | Lewallen | |
| 2009/0304218 | A1* | 12/2009 | Dodd | H04R 1/30 381/343 |
| 2013/0228393 | A1 | 9/2013 | Sterling et al. | |
| 2015/0319515 | A1 | 11/2015 | Devantier et al. | |
| 2015/0373445 | A1* | 12/2015 | Voishvillo | H04R 1/30 381/150 |
| 2016/0309257 | A1 | 10/2016 | Liu et al. | |
| 2018/0054671 | A1 | 2/2018 | Voishvillo | |
| 2018/0054672 | A1 | 2/2018 | Graber | |
| 2019/0174224 | A1 | 6/2019 | Chen | |
| 2019/0222925 | A1 | 7/2019 | Ha et al. | |

FOREIGN PATENT DOCUMENTS

| | | | |
|---|---|---|---|
| CN | 109565628 | A | 4/2019 |
| CN | 109889960 | A | 6/2019 |
| WO | 2021071488 | A1 | 4/2021 |

OTHER PUBLICATIONS

Chinese Office Action with English translation for Application No. 201980101221.9, dated Jul. 31, 2024, 16 pages.
International Search Report and Written Opinion for Application No. PCT/US2020/062459, dated Jul. 28, 2021, 19 pages.
International Preliminary report on Patentability for Application No. PCT/US2020/062459, dated May 30, 2023, 14 pages.
International Search Report and Written Opinion for Application No. PCT/US2019/055527, dated Jun. 24, 2020, 24 pages.
International Preliminary Report on Patentability for Application No. PCT/US2019/055527, dated Apr. 12, 2022, 15 pages.
Europe Office Action for Application No. 20 828 899.3, dated May 12, 2025, 9 pages.

* cited by examiner

OMNIDIRECTIONAL LOUDSPEAKER WITH ASYMMETRIC VERTICAL DIRECTIVITY

CROSS-REFERENCE TO RELATED APPLICATION

This application is the U.S. national phase of PCT Application No. PCT/US2020/062459 filed on Nov. 26, 2020, the disclosure of which is incorporated in its entirety by reference herein.

TECHNICAL FIELD

Embodiments relate to an omnidirectional loudspeaker with asymmetric vertical directivity, and a compression driver and waveguide for use in an omnidirectional loudspeaker.

BACKGROUND

An omnidirectional speaker radiates sound in all directions. Current designs of ceiling, pendant, and bollard omnidirectional loudspeakers include direct-radiating transducers having conical or dome diaphragms with corresponding "diffusers" which spread sound waves in an omnidirectional manner. The transducers are oriented in such a way that the diaphragm axis is oriented vertically, such that the sound radiation is converted to distribution in a horizontal plane. Unfortunately, direct-radiating transducers have a low efficiency, maximally a few percent. This limits the efficiency, sensitivity, and maximum sound pressure level (SPL) of transducers and loudspeaker systems providing omnidirectional radiation. Furthermore, in ceiling or pendant loudspeakers, sound radiation is typically distributed symmetrically in the vertical plane, but radiation the upper vertical hemisphere is not required or desirable.

SUMMARY

In one or more embodiments, a compression driver for an omnidirectional loudspeaker includes a motor assembly disposed about a central axis, and an annular diaphragm disposed coaxially below and operably connected to the motor assembly. A phasing plug is mounted to the motor assembly and includes a top portion facing the diaphragm and defines a compression chamber therebetween. The phasing plug includes a bottom portion extending downwardly from the top portion along the central axis from a first end to a second end, the phasing plug including a plurality of apertures that extend therethrough. The bottom portion has an inner surface that defines a cavity and widens from the first end to the second end, the inner surface having a plurality of radial channels with a diagonal orientation acoustically connected to the apertures. A housing is mounted to the phasing plug along the central axis and received within the cavity, the housing having an outer surface spaced from the inner surface of the bottom portion to form a waveguide arranged to radiate sound waves downwardly and outwardly with asymmetric vertical directivity.

In one or more embodiments, a waveguide for an omnidirectional loudspeaker includes a phasing plug including a top portion and a bottom portion extending downwardly from the top portion along a central axis from a first end to a second end. The phasing plug includes a plurality of apertures that extend therethrough, and the bottom portion has an inner surface that defines a cavity and widens from the first end to the second end, the inner surface having a plurality of radial channels with a diagonal orientation acoustically connected to the apertures. A housing is mounted to the phasing plug along the central axis and received within the cavity, the housing having an outer surface spaced from the inner surface of the bottom portion to form an annular pathway arranged to radiate sound waves downwardly and outwardly with asymmetric vertical directivity.

In one or more embodiments, an omnidirectional loudspeaker includes a compression driver having a motor assembly disposed about a central axis and an annular diaphragm disposed coaxially below and operably connected to the motor assembly. A phasing plug is mounted to the motor assembly and includes a top portion facing the diaphragm and defining a compression chamber therebetween. The phasing plug includes a bottom portion extending downwardly from the top portion along the central axis from a first end to a second end, the phasing plug including a plurality of apertures that extend therethrough. The bottom portion has an inner surface that defines a cavity and widens from the first end to the second end, the inner surface having a plurality of radial channels with a diagonal orientation acoustically connected to the apertures. A housing is mounted to the phasing plug along the central axis and received within the cavity, the housing having an outer surface spaced from the inner surface of the bottom portion to form a waveguide arranged to radiate sound waves downwardly and outwardly. A horn is mounted to the compression driver along the central axis to propagate the sound waves with asymmetric vertical directivity.

DETAILED DESCRIPTION

Figure 1:
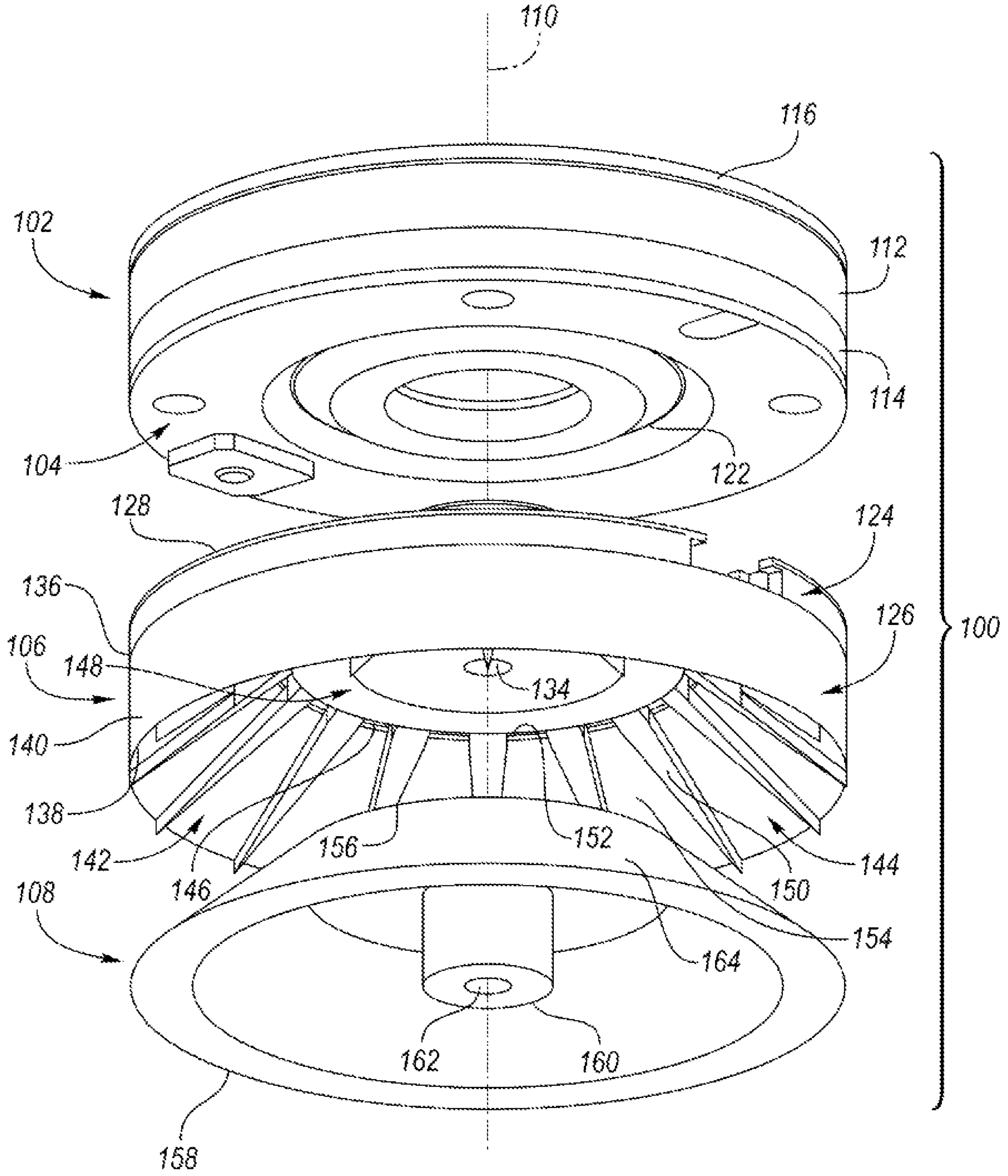
FIG. 1 is an exploded perspective view of a compression driver for use in an omnidirectional loudspeaker with asymmetric vertical directivity according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments disclosed herein include an omnidirectional loudspeaker which provides omnidirectional directivity in a horizontal plane while providing asymmetric vertical directivity. A compression driver is utilized, therefore providing high efficiency and sensitivity and lower distortion compared with direct-radiating speakers for the same SPL. In addition, the configuration of the phasing plug and waveguide disclosed herein makes it possible to radiate sound downwards and outwards simultaneously while naturally blending into the corresponding horn radiating outwards and downwards to provide optimized SPL coverage.

With reference first to FIGS. 1-5, a compression driver 100 is illustrated which includes a motor assembly 102, an annular flexural diaphragm 104 disposed below and operably connected to the motor assembly 102, a phasing plug 106 mounted to the motor assembly 102, and a housing 108 mounted to the phasing plug 106, all coaxially along a central axis 110. In one or more embodiments, the motor assembly 102 may comprise an annular permanent magnet 112 disposed between an annular top plate 114 and a back plate 116 that includes a centrally disposed cylindrical or annular pole piece 118, although the motor assembly 102 is not limited to this construction. As is known in the art, the motor assembly 102 provides a permanent magnetic field for electrodynamic coupling with a voice coil (not shown), wherein the voice coil is mechanically coupled to the diaphragm 104 and produces movement of the flexible portion of the diaphragm 104 to convert received electrical signals into sound waves. The motor assembly 102, the diaphragm 104, the phasing plug 106, and the housing 108 may be connected together by fasteners or adhesives.

There are two major types of compression drivers, the first utilizing a dome diaphragm and the other using an annular flexural diaphragm 104 as disclosed herein. One advantage of annular diaphragms is the smaller radial dimensions of the moving part of the diaphragm compared to dome diaphragms having the same diameter of the moving voice coil. In a compression driver, the diaphragm 104 is loaded by a compression chamber 120 (FIG. 2), which is a thin layer of air separating the diaphragm 104 from the phasing plug 106. The volume of air entrapped in the compression chamber 120 is characterized by an acoustical compliance which is proportional to the volume of compression chamber 120. In practice, the height of the compression chamber 120 may be quite small (e.g., approximately 0.5 mm or less) such that the volume of the compression chamber 120 is also small. The small radial dimension of the annular diaphragm 104 corresponds to the small radial dimensions of the matching compression chamber 120, which shifts undesirable air resonances (cross-modes) in the chamber to higher frequencies, sometimes above the audio range. Since the annular diaphragm 104 has two clamping perimeters, inside and outside of the moving part of the diaphragm 104, the annular diaphragm 104 has a better dynamic stability and it is less prone to the rocking modes compared to a dome diaphragm that has only external clamping. The diaphragm 104 may include a profiled section such as a V-shaped section 122 or may have other suitable configurations.

Figure 6A:
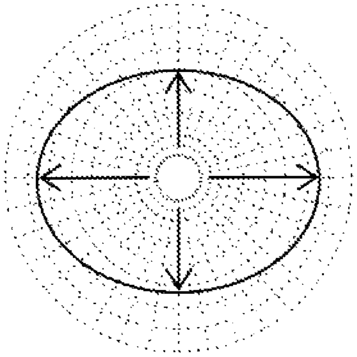
FIGS. 6A and 6B are schematic illustrations of directivity in the vertical plane for a symmetric omnidirectional driver and for the asymmetric omnidirectional driver of FIGS. 1-3, respectively.
Figure 6B:
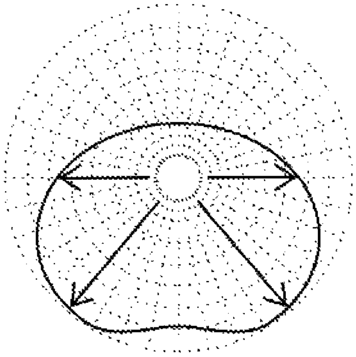

As a matter of background, FIG. 6A shows a schematic illustration of the directivity pattern in the vertical plane for a typical symmetric omnidirectional loudspeaker. At low frequencies, the loudspeaker is practically omnidirectional in the vertical plane. However, with the increase of frequency, the radiation upwards and downwards is attenuated, as illustrated by the arrows. There are a number of applications where vertical non-symmetric radiation is required, such as in ceiling loudspeakers or pendant loudspeakers. For such systems, the radiation in the upper vertical hemisphere is not required or desirable. FIG. 6B shows a schematic illustration of the directivity pattern in the vertical plane of an asymmetric omnidirectional loudspeaker as disclosed herein, which is the desired directivity pattern in the vertical plane for ceiling or pendant-type loudspeakers.

In this case illustrated in FIG. 6B, the acoustical energy is directed predominantly down and sideways, as illustrated by the arrows, providing sound illumination underneath the loudspeaker covering a certain area. The recess of the directivity response under the loudspeaker is desired to compensate for the attenuation of the directivity response in the horizontal plane (at listener level) with distance as the listener is moving away from the pendant or ceiling loudspeaker. For example, for a typical ceiling or pendant loudspeaker which has 140 degrees coverage corresponding to −6 dB attenuation in the polar response, the attenuation corresponding to a projected listening plane underneath the loudspeaker is about −15 dB. Therefore, the directivity pattern should compensate for the extra attenuation caused by the transformation from the polar directivity requirement to the listening plane directivity.

Figure 4:
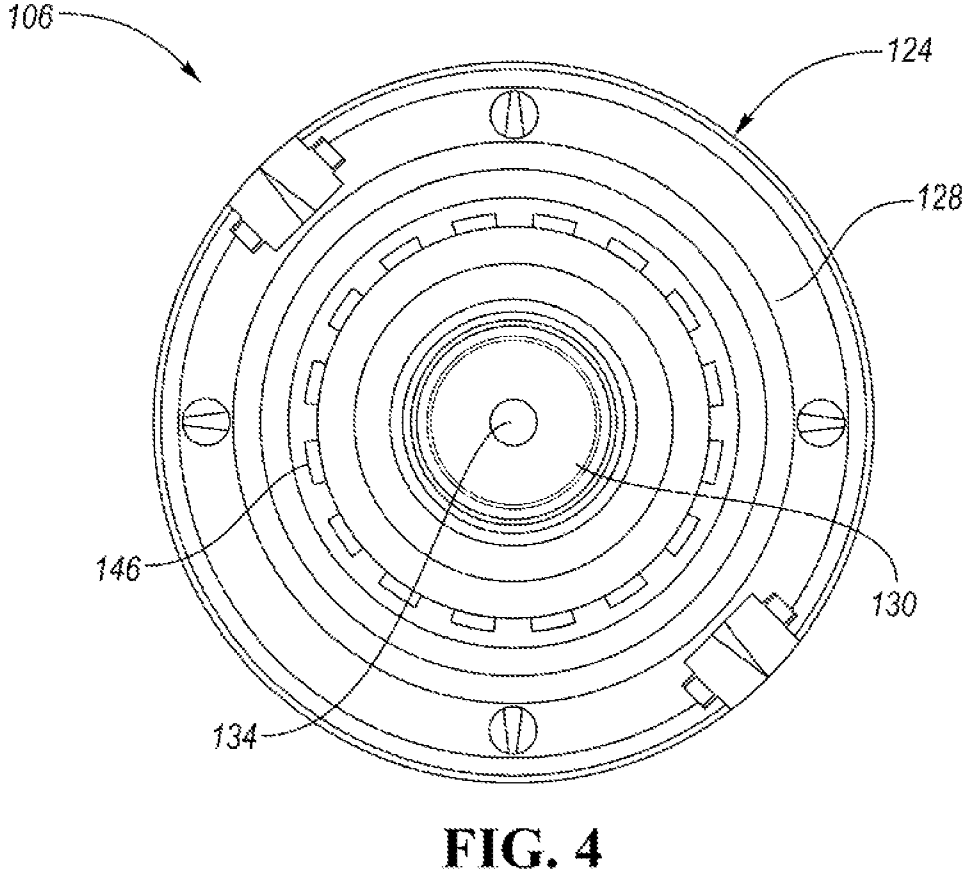
FIG. 4 is a top view of a phasing plug of the compression driver according to one or more embodiments.
Figure 5:
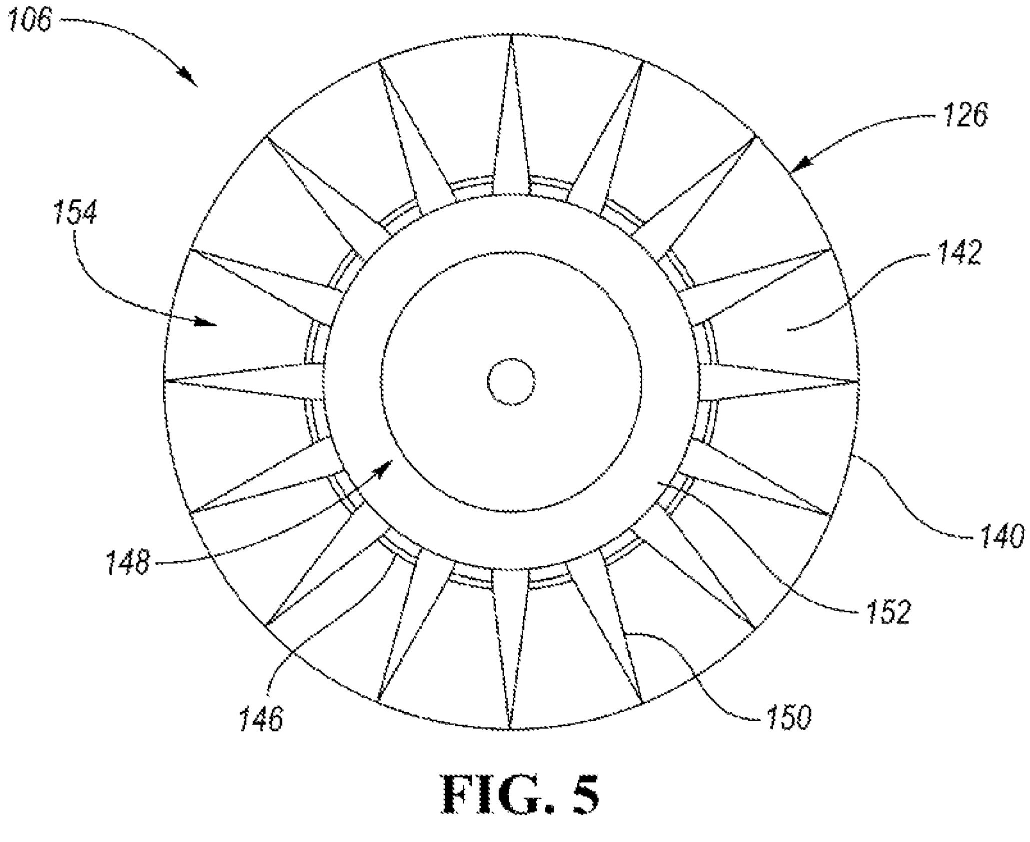
FIG. 5 is a bottom view of the phasing plug of FIG. 4.

To achieve compensation for extra attenuation in the listening plane, the phasing plug 106 disclosed herein includes a top portion 124 and a bottom portion 126 extending downwardly from the top portion 124 along the central axis 110, as best shown in FIGS. 1 and 4-5. The top portion 124 includes a top side 128 facing the diaphragm 104, where the compression chamber 120 is defined in a space between the diaphragm 104 and the top side 128. The top portion 124 may be integrally formed with the bottom portion 126 or may be attached to the bottom portion 126 by any suitable means. The top portion 124 of the phasing plug 106 may be generally circular or may have any other suitable geometry. The top portion 124 may be coupled or mounted to the back plate 116 of the motor assembly 102.

Figure 2:
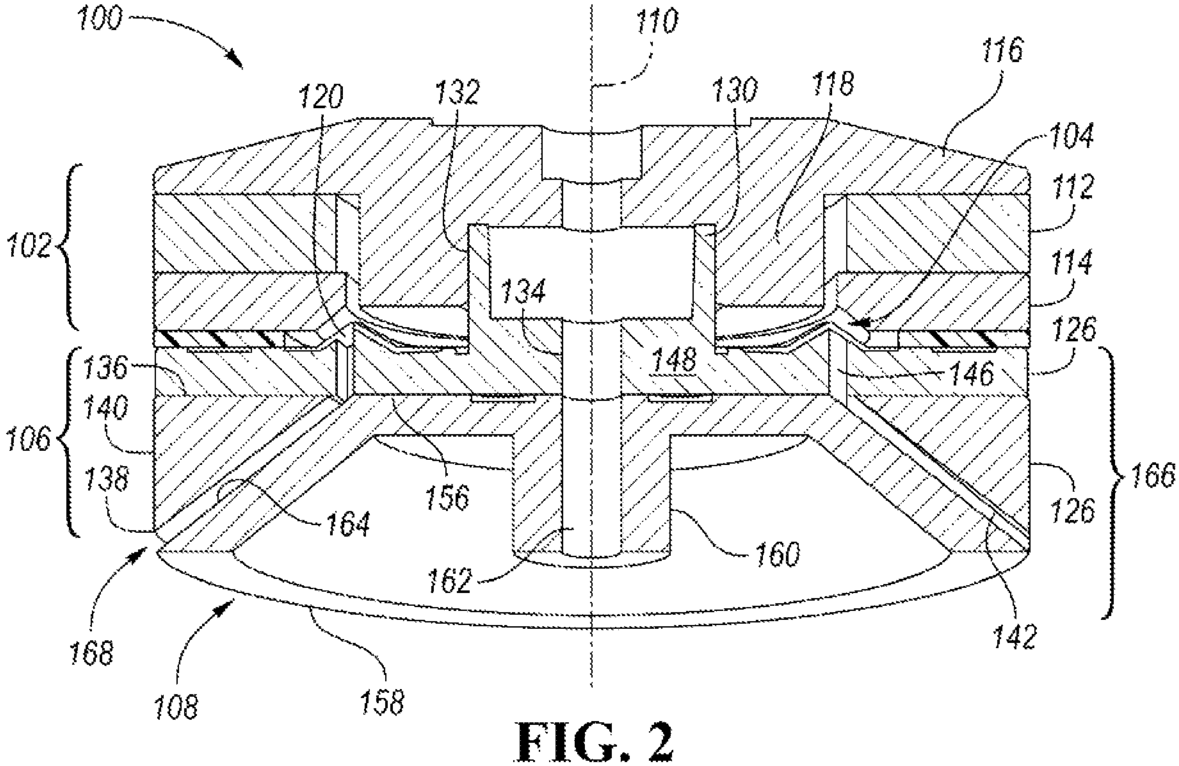
FIG. 2 is a cross-sectional view of the assembled compression driver of FIG. 1.

With reference to FIGS. 2 and 4, the phasing plug 106 may include a mounting member 130 on the top portion 124 that depends upwardly from the top side 128. The mounting member 130 may have any configuration suitable for coupling the phasing plug 106 to the motor assembly 102 or to the rear section of the compression driver 100. In one embodiment, the mounting member 130 may be provided in the form of a cylinder that is arranged to be press fit into a recess 132 formed in the pole piece 118. The phasing plug 106 may further include a central bore 134 for coupling or mounting the phasing plug 106 to the back plate 116 of the motor assembly 102 via a fastener (not shown).

Figure 3:
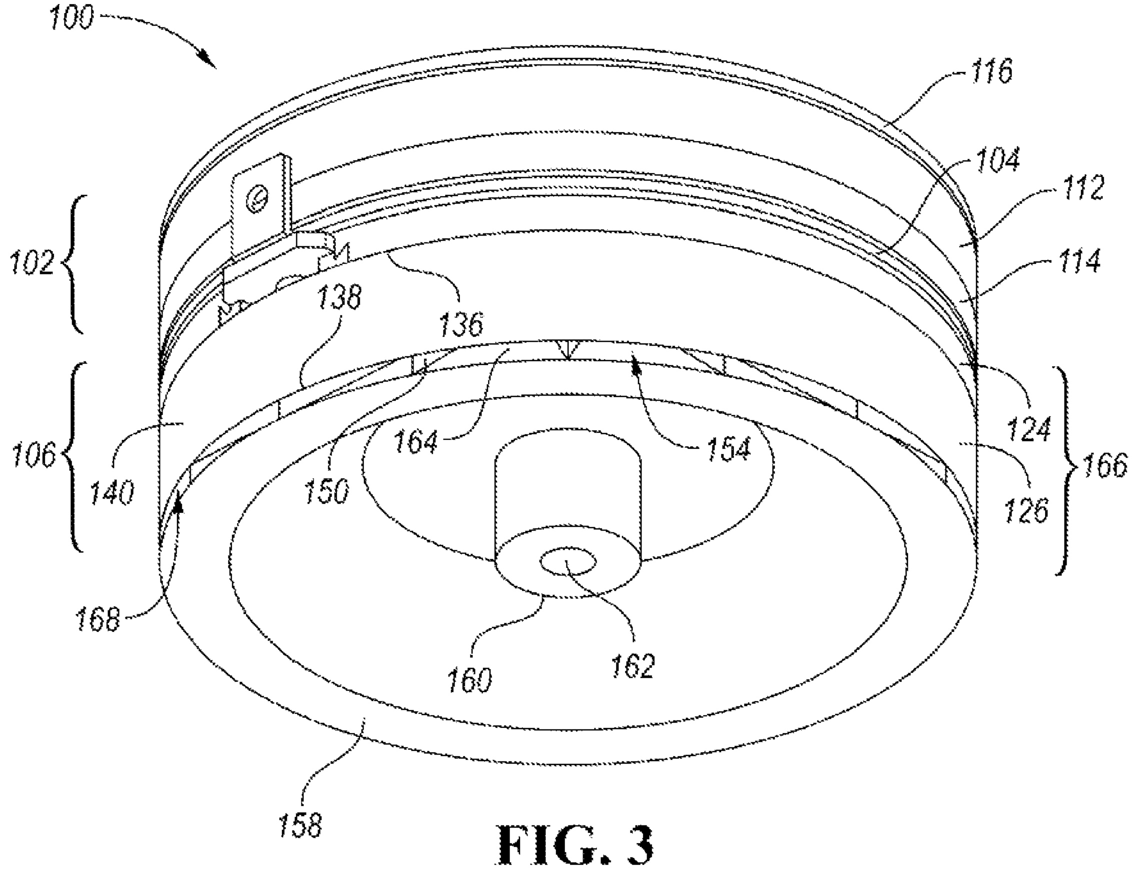
FIG. 3 is a bottom perspective view of the assembled compression driver of FIG. 1.

As shown in FIGS. 1-3, the bottom portion 126 has a first end 136 disposed proximate to the top portion 124 and a second end 138 disposed at a distance from the top portion 124. An exterior surface 140 of the bottom portion 126 may be generally cylindrical, while an inner surface 142 of the bottom portion 126 may widen with respect to the central axis 110 from the first end 136 to the second end 138. As such, the inner surface 142 may be generally frustoconical in shape and define a cavity 144, with a radius from the central axis 110 to the inner surface 142 increasing from the first end 136 to the second end 138.

Figure 9:
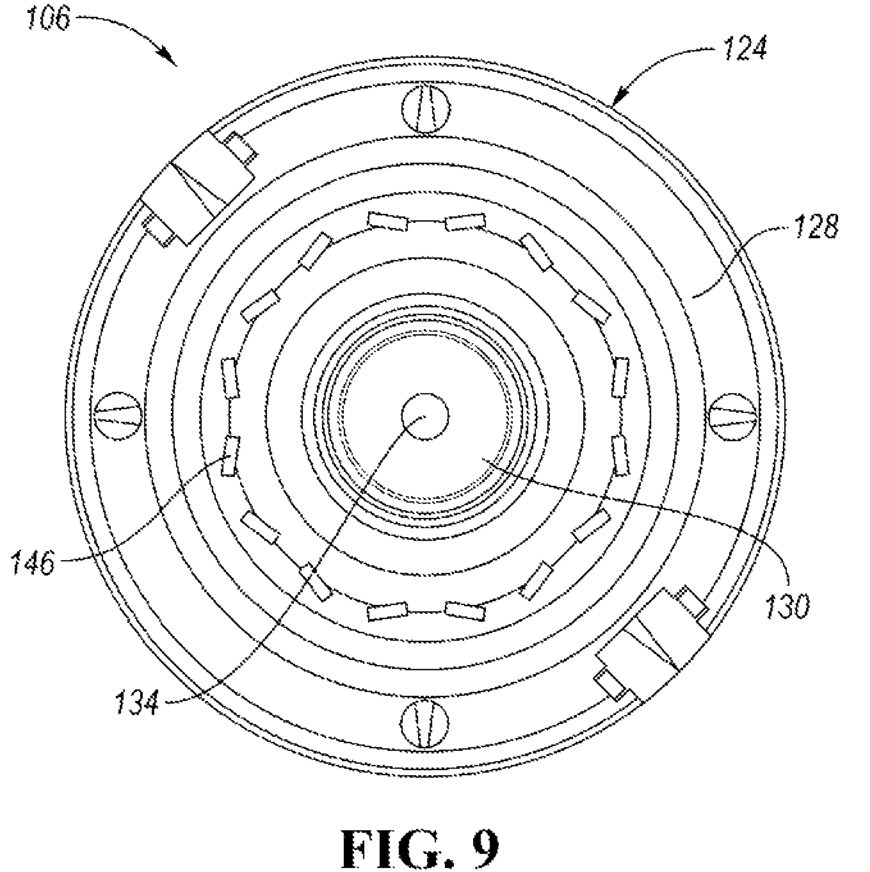
FIG. 9 is a top view of a phasing plug of the compression driver according to another embodiment.
Figure 10:
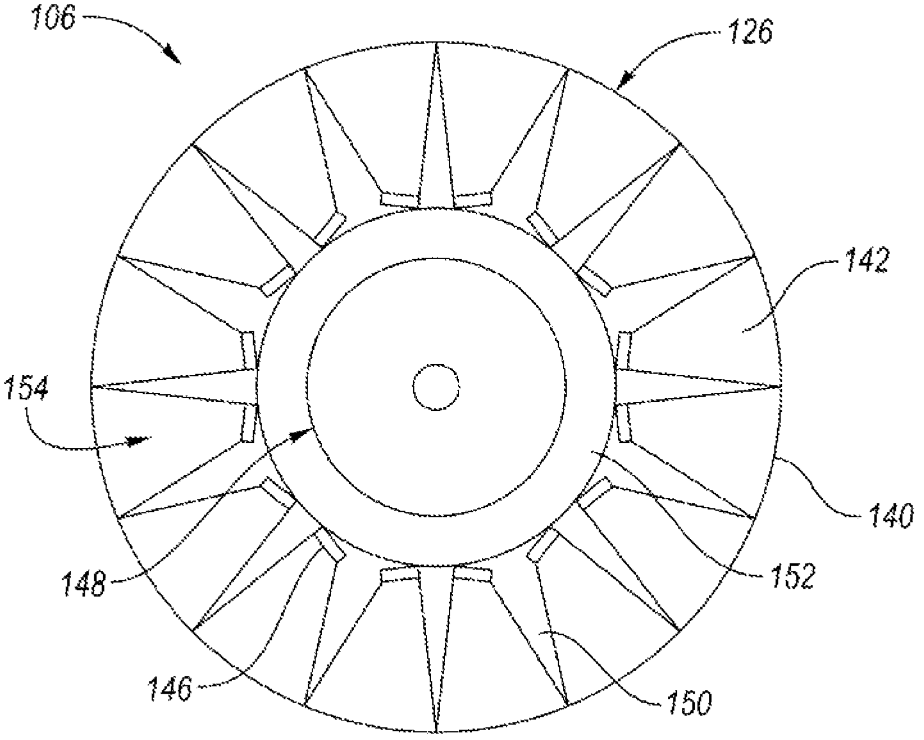
FIG. 10 is a bottom view of the phasing plug of FIG. 9.

As illustrated in FIGS. 1-2 and 4-5, the phasing plug 106 includes a plurality of apertures 146 that extend through the phasing plug 106 from the top portion 124 to the bottom portion 126 through which sound energy created by the diaphragm 104 may travel. With the apertures 146, the area of the entrance to the phasing plug 106 is significantly smaller than the area of the diaphragm 104. In the embodiments depicted herein, the apertures 146 may be arranged generally circumferentially about the central axis 110, generally forming a circle. However, the apertures 146 are not limited to the embodiments depicted herein and may include other suitable shapes and configurations. For example, in an alternative embodiment depicted in FIGS. 9 and 10, the apertures 146 may be diagonal slots positioned end-to-end, such as in a "zig-zag" or sawtooth type pattern arranged generally circumferentially about the central axis 110. This "meandering" distribution of the apertures 146 may have the effect of smearing the air resonances in the compression chamber 120 so as to shape and improve the wavefront exiting the compression driver 100.

In one or more embodiments, the inner surface 142 of the bottom portion 126 may have a central section 148 and a plurality of arms 150 extending downwardly and outwardly therefrom, as best shown in FIGS. 1 and 5. The apertures 146 may be disposed along or form an edge 152 of the central section 148, with an arm 150 extending between each adjacent pair of apertures 146. Said another way, an arm 150 may be disposed on each side of an aperture 146. Evident from a bottom view (see FIG. 5), each arm 150 may be generally triangular in shape. With the triangular shape, the arms 150 are widest adjacent the edge 152 of the central section 148 and taper in width toward the second end 138 of the bottom portion 126. Of course, it is understood that the phasing plug 106 is not limited to the embodiments depicted herein, and that the top portion 124 and the bottom portion 126 may include other suitable shapes and configurations. For example, in an alternative embodiment, each arm 150 could have a thin-walled configuration with a generally constant width.

Each aperture 146 is therefore acoustically connected to a corresponding radial channel 154 defined between each pair of adjacent arms 150. The radial channels 154 may have expanding width and merge at the second end 138 of the bottom portion 126. The channels 154 may function to ensure even distribution of sound pressure around the entirety of the compression driver 100 for achieving omnidirectional radiation of sound in a horizontal plane. Advantageously, the diagonal orientation of the radial channels 154 in the phasing plug 106 direct acoustical signals outwards and downwards simultaneously. In addition to the embodiments depicted herein, it is also contemplated that the phasing plug 106 could include a lesser or greater number of apertures 146 or channels 154, or alternatively could be configured without radially expanding channels 154.

With reference to FIGS. 1-3, the housing 108 is received within the cavity 144 and attached to the bottom portion 126 of the phasing plug 106. The housing 108 has a top end 156 disposed on or attached to the phasing plug 106 (e.g., at the central section 148 of the bottom portion 126), and a bottom end 158 disposed at a distance from the bottom portion 126. The housing 108 may include a downwardly extending boss 160 with a central bore 162 for mounting the housing 108 to the bottom portion 126 and the motor assembly 102 via a fastener (not shown). As shown, the housing 108 may be generally frustoconical in shape, where an outer surface 164 of the housing 108 may have a generally straight, smooth contour from the top end 156 to the bottom end 158. When assembled, the bottom portion 126 of the phasing plug 106 and the housing 108 together form a waveguide 166. More particularly, the inner surface 142 of the bottom portion 126 and the outer surface 164 of the housing 108 may cooperatively form the waveguide 166 and an annular exit 168 of the compression driver 100, providing a generally annular pathway for the propagation of sound waves from the apertures 146 to the annular exit 168. The waveguide 166 may function to control directivity of sound waves (i.e., coverage of sound pressure over a particular listening area) that propagate out of the compression driver 100 into the ambient environment and to increase reproduced SPL over a certain frequency range.

Figure 7:
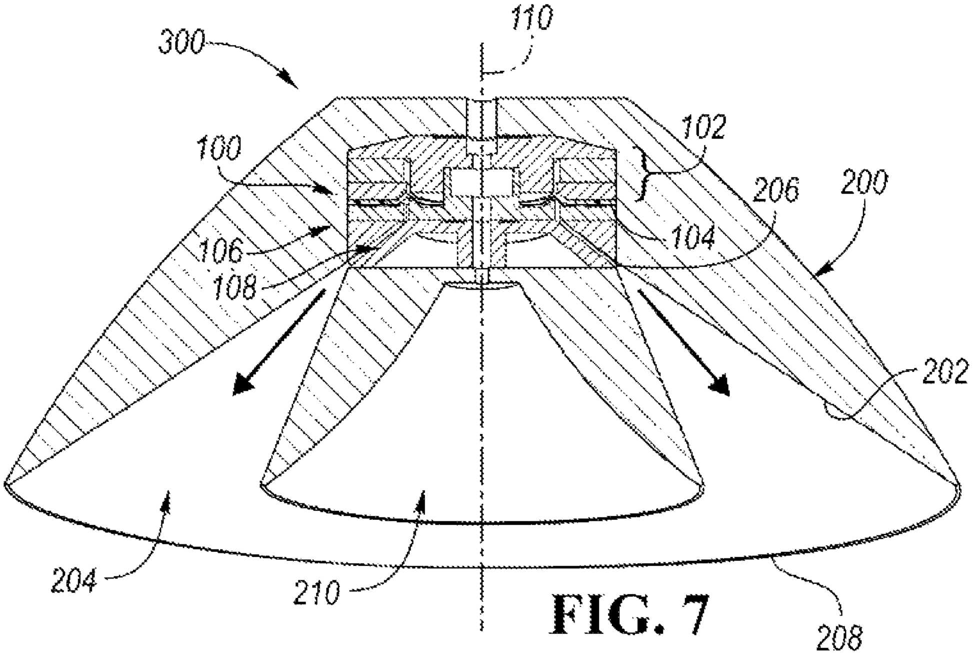
FIG. 7 is a cross-sectional view of an omnidirectional loudspeaker with asymmetric vertical directivity including the compression driver of FIGS. 1-5 and an attached horn according to one or more embodiments.
Figure 8:
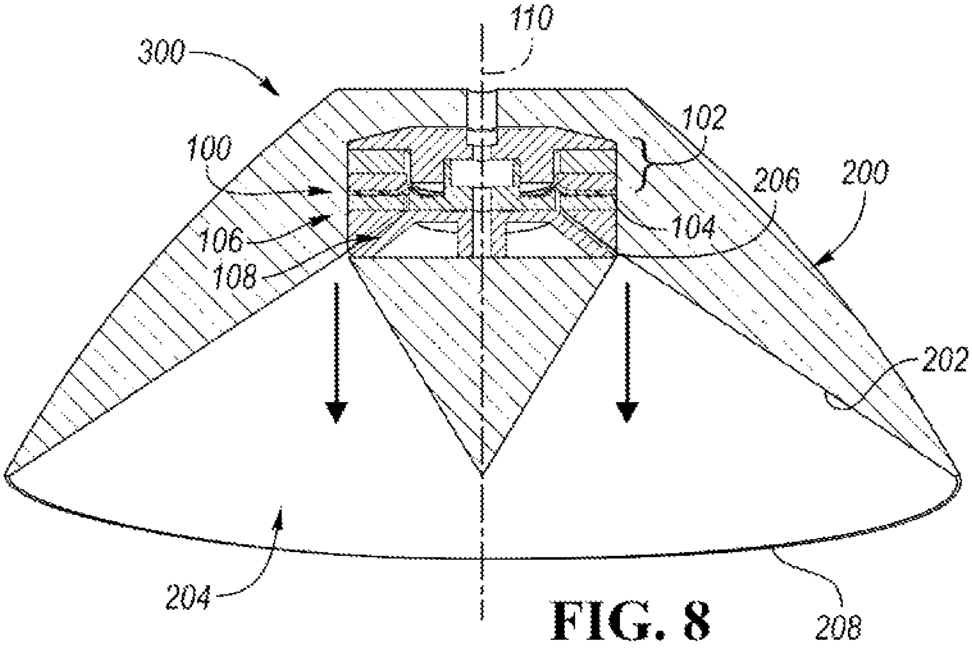
FIG. 8 is a cross-sectional view of an omnidirectional loudspeaker with asymmetric vertical directivity including the compression driver of FIGS. 1-5 and an attached horn according to another embodiment.

With reference to FIGS. 7 and 8, cross-sectional views of an omnidirectional loudspeaker 300 including the compression driver 100 and an attached horn 200 according to one or more embodiments are illustrated. The compression driver 100 and the horn 200 are generally symmetrically disposed about the central axis 110. As shown in FIGS. 7 and 8, the horn 200 may include one or more walls 202 that enclose an interior 204 of the horn 200. The horn walls 202 may widen outwardly from the central axis 110 to provide an expanding cross-sectional area through which sound waves propagate. The horn walls 202 form an inlet 206, or throat, adjacent the bottom portion 126 of the phasing plug 106, and an outlet 208, also referred to as the horn mouth. The horn 200 includes suitable construction for mounting to the compression driver 100 by fasteners or adhesive, such as via the boss 160 and central bore 162 of the housing 108. The phasing plug 106, housing 108, and the waveguide 166 they create as disclosed herein provide a smooth transition to the correspondingly oriented axisymmetric horn 200 that provides uniform coverage of the listening area underneath the loudspeaker.

In operation, actuation of the diaphragm 104 by the motor assembly 102 generates high pressure acoustical signals within the compression chamber 120 which travel as sound waves through the top portion 124 and bottom portion 126 of the phasing plug 106 via the apertures 146. The acoustical signals then travel through the radial channels 154 within the waveguide 166 formed by the bottom portion 126 and the outer surface 164 of the housing 108 and out the annular exit 168. The sound waves enter and radiate through the attached horn inlet 206, through the interior 204 of the horn 200, and propagate into the ambient environment from the horn outlet 208. The overall acoustical cross-sectional area of the air paths, including the apertures 146 and outwardly radiating channels 154, gradually increase to provide a smooth transition of sound waves.

FIGS. 7 and 8 show examples of assemblies of the compression driver 100 and the horn 200 with different coverage in the vertical plane and different ratios of SPL underneath the loudspeaker 300 and at a distance. The configuration of FIG. 7 provides a "longer throw" in the sense that the difference of SPL underneath the loudspeaker 300 and at a certain distance from the loudspeaker 300 is larger than in the version shown in FIG. 8. The arrows in each figure show the orientation of the radiation direction of the horn 200. A tweeter (not shown) could possibly be provided in the smaller horn 210 of FIG. 7. The horns 200 depicted in FIGS. 7 and 8 are merely exemplary, and other configurations are fully contemplated.

It is understood that directional identifiers such as top, bottom, above, below, upper, lower, upwardly and downwardly used herein are not intended to be limiting, and are simply used to provide an exemplary environment for the components of the compression driver 100, horn 200, and omnidirectional loudspeaker 300 as disclosed herein. Any directional terms as used herein are merely to indicate the relative placement of various components of the compression driver 100, horn 200, and omnidirectional loudspeaker 300 and are not intended to be limiting.

Applications for the compression driver 100 and omnidirectional loudspeaker 300 described herein include, but are not limited to, landscape sound systems, home lifestyle loudspeaker systems, public address systems, alarm and warning sound systems, portable audio Bluetooth-based loudspeakers, high-powered pendant speakers, negative directivity ceiling speakers, or other applications where omnidirectionality in the horizontal plane and asymmetric vertical directivity is desired or required. Compared with direct-radiating dome speakers, use of the compression driver 100 in the omnidirectional loudspeaker 300 disclosed herein results in a ten-fold increase in efficiency and sensitivity, as well as an increase in maximum sound pressure level.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compression driver for an omnidirectional loudspeaker, the compression driver comprising:

a motor assembly disposed about a central axis;

an annular diaphragm disposed coaxially below and operably connected to the motor assembly;

a phasing plug mounted to the motor assembly and including a top portion facing the diaphragm and defining a compression chamber therebetween, the phasing plug including a bottom portion extending downwardly from the top portion along the central axis from a first end to a second end, the phasing plug including a plurality of apertures that extend therethrough, the bottom portion having an inner surface that defines a cavity and widens from the first end to the second end, the inner surface having a plurality of radial channels with a diagonal orientation acoustically connected to the apertures; and a housing mounted to the phasing plug along the central axis and received within the cavity, the housing having an outer surface spaced from the inner surface of the bottom portion to form a waveguide arranged to radiate sound waves downwardly and outwardly with asymmetric vertical directivity.

2. The compression driver of claim 1, wherein the plurality of radial channels have expanding width and merge at the second end of the bottom portion.

3. The compression driver of claim 1, wherein the plurality of apertures are arranged generally circumferentially about the central axis.

4. The compression driver of claim 1, wherein the inner surface of the bottom portion has a central section and a plurality of arms extending downwardly and outwardly therefrom, wherein a pair of adjacent arms defines one of the plurality of radial channels therebetween, with one of the plurality of arms extending between each adjacent pair of apertures.

5. The compression driver of claim 4, wherein each of the plurality of arms is generally triangular in shape and is widest adjacent an edge of the central section and tapers in width toward the second end of the bottom portion.

6. The compression driver of claim 1, wherein the inner surface of the bottom portion has a frustoconical shape, with a radius from the central axis to the inner surface increasing from the first end to the second end.

7. The compression driver of claim 1, wherein the housing is generally frustoconical in shape and wherein the outer surface has a generally straight, smooth contour from a top end to a bottom end.

8. A waveguide for an omnidirectional loudspeaker, the waveguide comprising:

a phasing plug including a top portion and a bottom portion extending downwardly from the top portion along a central axis from a first end to a second end, the phasing plug including a plurality of apertures that extend therethrough, the bottom portion having an inner surface that defines a cavity and widens from the first end to the second end, the inner surface having a plurality of radial channels with a diagonal orientation acoustically connected to the apertures; and a housing mounted to the phasing plug along the central axis and received within the cavity, the housing having an outer surface spaced from the inner surface of the bottom portion to form an annular pathway arranged to radiate sound waves downwardly and outwardly with asymmetric vertical directivity.

9. The waveguide of claim 8, wherein the plurality of radial channels have expanding width and merge at the second end of the bottom portion.

10. The waveguide of claim 8, wherein the plurality of apertures are arranged generally circumferentially about the central axis.

11. The waveguide of claim 8, wherein the inner surface of the bottom portion has a central section and a plurality of arms extending downwardly and outwardly therefrom, wherein a pair of adjacent arms defines one of the plurality of radial channels therebetween, with one of the plurality of arms extending between each adjacent pair of apertures.

12. The waveguide of claim 11, wherein each of the plurality of arms is generally triangular in shape and is widest adjacent an edge of the central section and tapers in width toward the second end of the bottom portion.

13. The waveguide of claim 8, wherein the inner surface of the bottom portion has a frustoconical shape, with a radius from the central axis to the inner surface increasing from the first end to the second end.

14. The waveguide of claim 8, wherein the housing is generally frustoconical in shape and wherein the outer surface has a generally straight, smooth contour from a top end to a bottom end.

15. An omnidirectional loudspeaker, comprising:

a compression driver including a motor assembly disposed about a central axis;

an annular diaphragm disposed coaxially below and operably connected to the motor assembly;

a phasing plug mounted to the motor assembly and including a top portion facing the diaphragm and defining a compression chamber therebetween, the phasing plug including a bottom portion extending downwardly from the top portion along the central axis from a first end to a second end, the phasing plug including a plurality of apertures that extend therethrough, the bottom portion having an inner surface that defines a cavity and widens from the first end to the second end, the inner surface having a plurality of radial channels with a diagonal orientation acoustically connected to the apertures; and a housing mounted to the phasing plug along the central axis and received within the cavity, the housing having an outer surface spaced from the inner surface of the bottom portion to form a waveguide arranged to radiate sound waves downwardly and outwardly; and a horn mounted to the compression driver along the central axis to propagate the sound waves with asymmetric vertical directivity.

16. The omnidirectional loudspeaker of claim 15, wherein the plurality of radial channels have expanding width and merge at the second end of the bottom portion.

17. The omnidirectional loudspeaker of claim 15, wherein the plurality of apertures are arranged generally circumferentially about the central axis.

18. The omnidirectional loudspeaker of claim 15, wherein the inner surface of the bottom portion has a central section and a plurality of arms extending downwardly and outwardly therefrom, wherein a pair of adjacent arms defines one of the plurality of radial channels therebetween, with one of the plurality of arms extending between each adjacent pair of apertures.

19. The omnidirectional loudspeaker of claim 18, wherein each of the plurality of arms is generally triangular in shape and is widest adjacent an edge of the central section and tapers in width toward the second end of the bottom portion.

20. The omnidirectional loudspeaker of claim 15, wherein the housing is generally frustoconical in shape and wherein the outer surface has a generally straight, smooth contour from a top end to a bottom end.

* * * * *